(12) United States Patent
Appelberg et al.

(10) Patent No.: US 6,304,039 B1
(45) Date of Patent: Oct. 16, 2001

(54) POWER SUPPLY FOR ILLUMINATING AN ELECTRO-LUMINESCENT PANEL

(75) Inventors: Gustaf T. Appelberg, Fairfield, CT (US); Joseph W. Fleming, Ramsey, NJ (US); Jerrold Milks, Monroe; Douglas A. George, Watertown, both of CT (US)

(73) Assignee: E-Lite Technologies, Inc., Trumbull, CT (US)

( * ) Notice: Subject to any disclaimer, the term of this patent is extended or adjusted under 35 U.S.C. 154(b) by 0 days.

(21) Appl. No.: 09/634,448

(22) Filed: Aug. 8, 2000

(51) Int. Cl.[7] ........................................................ G09G 3/10
(52) U.S. Cl. ...................... 315/169.3; 315/224; 315/225; 315/276; 315/283; 361/42
(58) Field of Search ............................ 315/169.3, 209 R, 315/224, 225, 248, 276, 283, 290, 291, 307, DIG. 7; 361/42, 114, 115; 323/355; 363/73

(56) References Cited

U.S. PATENT DOCUMENTS

| 4,988,889 | * | 1/1991 | Oughton, Jr. ........................ 307/66 |
| 5,142,202 | * | 8/1992 | Sun et al. ............................ 315/225 |
| 5,144,203 | | 9/1992 | Fujita et al. ...................... 315/169.3 |
| 5,262,699 | * | 11/1993 | Sun et al. ............................ 315/224 |
| 5,293,098 | | 3/1994 | Brownell ........................... 315/169.3 |
| 5,335,162 | | 8/1994 | Martin-Lopez et al. ............... 363/97 |
| 5,463,283 | | 10/1995 | Sanderson ........................ 315/209 R |
| 5,517,089 | | 5/1996 | Ravid .................................. 315/307 |
| 5,677,599 | | 10/1997 | Wood ................................. 315/169.3 |
| 6,043,609 | * | 3/2000 | George et al. .................... 315/169.3 |

* cited by examiner

Primary Examiner—Don Wong
Assistant Examiner—Thuy Vinh Tran
(74) Attorney, Agent, or Firm—Ware, Fressola, Van Der Sluys & Adophson LLP

(57) ABSTRACT

A power supply is provided for illuminating an electro-luminescent lamp with a constant current and frequency drive signal having a predetermined limiting voltage level for compensating changes in the electro-luminescent lamp characteristics. The power supply operates from an AC or DC input voltage power source and includes an electronic ground fault current interrupter circuit means with remote reset capability to provide protection for the power supply and against user injury. An auto line AC voltage selection circuit senses and selects the proper voltage operating configuration without operator intervention. The status of an LED in conjunction with the status of the electro-luminescent lamp is used as an internal diagnostic aid to assist a user in isolating fault conditions. External signals from a lighting control panel are coupled via an input control circuit to the power supply to provide special lighting effects.

10 Claims, 8 Drawing Sheets

| FIG.2A | FIG.2B | FIG.2C |

POWER SUPPLY FOR ILLUMINATING AN ELECTRO-LUMINESCENT PANEL

FIELD OF THE INVENTION

The present invention relates generally to a power supply for regulating power to an EL lamp, and more particularly to a power supply for illuminating an electro-luminescent lamp or panel.

BACKGROUND OF THE INVENTION

Power supplies for electro-luminescent (EL) lamps or panels typically include inverters having a regulated or fixed output, or a tuned circuit for a single lamp or panel size. Tuned inverters typically can be optimized only for a single lamp size. In other words, the tuned circuitry requires the matching of the inverter to the size or surface area of the EL panel. Such tuned inverters can have some compensation for change in lamp load due to aging in that the drive signal current and voltage will rise slowly over time as the lamp ages in order to maintain power to the lamp. There are a number of drawbacks with prior tuned inverters. For example, the inverters cannot power a wide range of lamp sizes; therefore, it is necessary to inventory numerous different and distinct inverters to cover a reasonable range of lamp sizes. The inventory approach is both inefficient and uneconomical. Further, these tuned inverters provide only modest compensation for change in the lamp load due to aging. Such compensation only marginally improves half-life over inverters having regulated or constant or fixed outputs.

Regulated or fixed output inverters can power a range of lamp sizes, but have no load compensation for the EL lamp as it ages over its operating life. Therefore, the brightness half-life values of EL lamps powered by such fixed output inverters are relatively short. An additional drawback with both fixed output and tuned inverters is that most have been known to provide only DC voltage inputs, but not AC voltage inputs, such as at 115 VAC or 230 VAC. For large EL lamp sizes, AC voltage inputs are the only practical means of operation for the fixed output and tuned inverters.

There has been a recent demand for brighter electro-luminescent lamps even if such brighter lamps should result in a shorter total operating life. Furthermore, the market is demanding an electro-luminescent power supply, which operates over a range of lamp sizes without the above-mentioned disadvantages. Applicant's U.S. Pat. No. 6,043,609, titled, Control Circuit and Method for Illuminating an Electro-luminescent Panel represents an improvement over known EL power supplies.

Although applicant's above referenced EL power supply operates over a range of lamp sizes and provides voltage compensation due to aging of the EL lamp, the upper range of lamp size is limited to approximately 2,500 square inches. Larger size applications of EL lamps for example, up to 12,500 square inches or approximately 5 times the area that can presently be illuminated with applicant's EL power supplies cannot be accommodated.

A further disadvantage is the above and other known power supplies cannot typically operate for any appreciable length of time without circuit component damage or failure when operating into an open load or a shorted load condition both of which conditions are readily present in actual practice and usage. EL power supply failures due to open or shorted conditions are costly, not only because of damage to the power supply, but also due to lost revenues from unlit advertisements for example.

Also, known EL power supplies are typically protected by line fuses that only "blow" after their current ratings are exceeded or by internal fuses within the EL power supply. The reaction time of line fuses or internal fuses is generally too slow to prevent damage to the EL power supply or injury to a person in contact with the EL power supply or EL lamp. In order to restore operation of the EL power supply, an operator must access the EL power supply at its location. It is desirable therefore to provide protection for the EL power supply that has a fast reaction time to prevent damage to the EL power supply and which allows restoration of the EL power supply from a remote location.

A further disadvantage of known EL power supplies is the lack of an internal diagnostic aid to indicate and localize the likely faulty component area or circuit of the EL power supply.

The market is further demanding an EL power supply that operates from both AC and DC voltage power sources and has automatic detection and line voltage selection for 110 VAC or 220 VAC without operator intervention.

A further drawback with known EL power supplies is the inability to drive EL lamps to produce dimming or special effects as typically done with incandescent lights in theaters and other such locations. Such optional or special effect features are typically effectuated by means of a control panel which provides a standard industry encoded signal to cause the desired dimming, or dynamic display such as flashing or other rapid turning-on and turning-off of lights. Known EL power supplies lack an input interface to such industry standard control panels and typically do not react quickly enough to achieve the desired result.

Accordingly, it is an object of the present invention to provide a power supply or ballast, which operates from AC and DC power sources to illuminate a range of EL lamp sizes while providing load compensation to accommodate aging of the EL lamp.

It is another object of the present invention to provide a power supply for an electro-luminescent lamp, which operates from both AC and DC voltage power sources.

It is yet another object of the present invention to provide a power supply for electro-luminescent lamp that automatically detects and selects the required line voltage-operating mode.

It is yet a further object of the present invention to provide an internal diagnostic aid to identify and localize a likely faulty component area of the circuit.

It is yet another object of the present invention to provide protection for a power supply which is remotely resettable.

It is yet a further object of the present invention to provide a power supply to illuminate an EL lamp with special effects.

SUMMARY OF THE INVENTION

A power supply for illuminating an EL lamp includes means for providing an AC or DC input voltage power source signal to the power supply which includes a controller for generating an alternating drive voltage signal having a substantially constant current and frequency to illuminate the EL lamp. An electronic ground fault current interrupter couples the input voltage power source to a DC voltage generating circuit means to produce a first and second DC high voltage supply potential. Transformer logic circuit means are coupled to the controller and produce alternating output voltage signals having a 180° phase relationship to one another. The alternating output voltage signals drive first and second electronic switching means connected in series with one another and to a resonant circuit made up of a choke and the EL lamp. The electronic switching means are turned on and off to alternately connect the EL lamp between the first and second DC high voltage supply potential.

In another aspect of the invention, an automatic line voltage select circuit means senses and detects the voltage power source signal to condition the power supply for one of the 110 or 220 volt operating modes corresponding to the presence of a 110 or 220 volt input voltage power source signal.

In another aspect of the invention, diagnostic indicator circuit means includes a dc low voltage supply circuit means for powering the controller and a light emitting diode (LED) for identifying and localizing one or more likely sources of component failure when the EL lamp does not illuminate.

In a yet further aspect of the invention, the electronic ground fault current interrupter includes electronic reset circuit means to reconnect the input voltage power source signal to the DC high voltage supply generating circuit means without operator intervention. A feature of the electronic ground fault current interrupter allows the reset circuit means to operate and be located remotely from the power supply location.

In a still further aspect of the invention, input control circuit means are coupled to the controller for receiving and interfacing external control signals to the power supply to produce special lighting effects including flashing and dimming of the EL lamp.

The above and other objects and advantages of this invention will become more readily apparent when the following description is read in conjunction with the accompanying drawings.

DETAILED DESCRIPTION OF THE PREFERRED EMBODIMENTS

Figure 1:
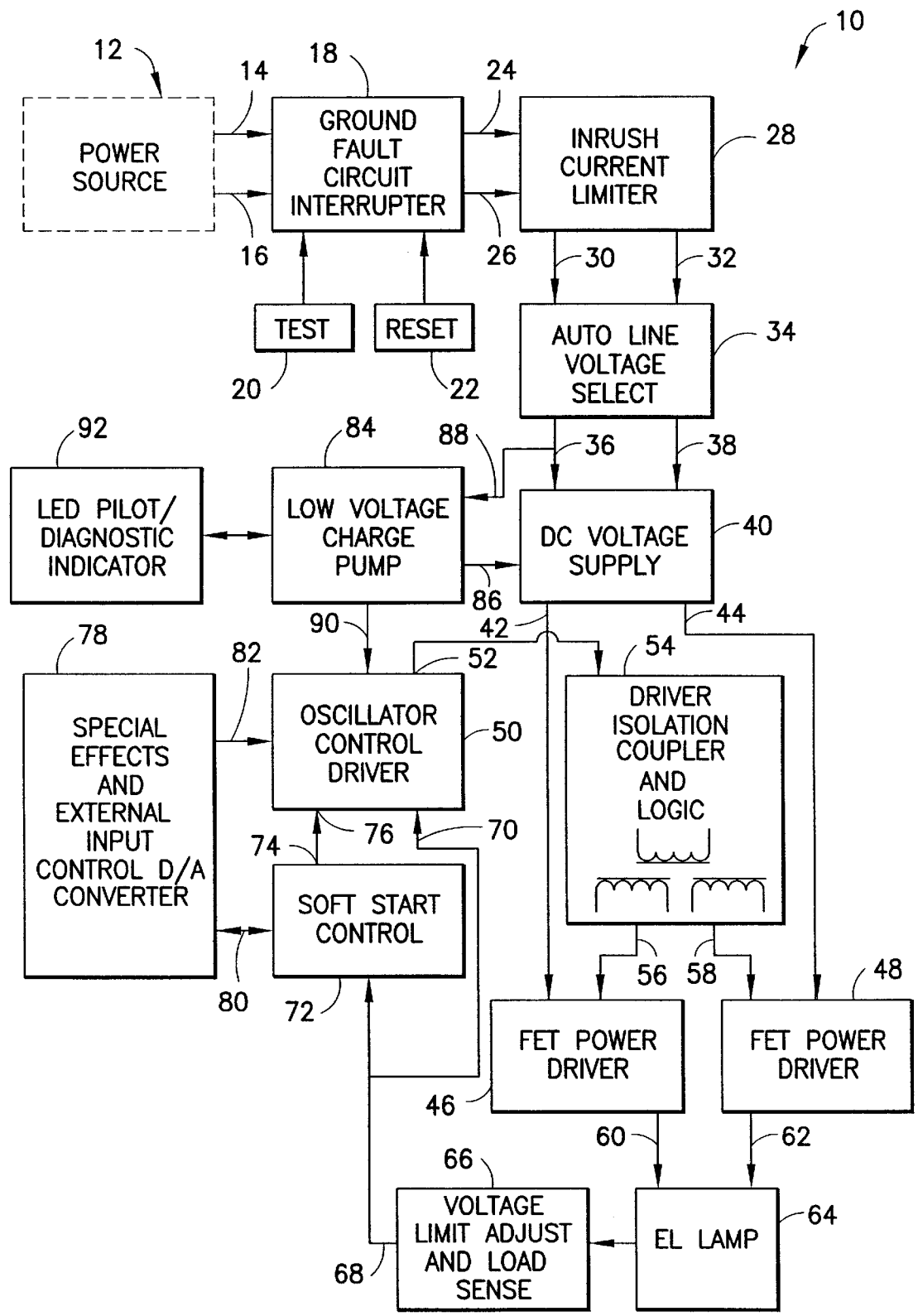
FIG. 1 is a schematic functional block diagram of a power supply for an electro-luminescent lamp.

Turning now to the drawings and considering the invention in further detail, FIG. 1 illustrates a schematic functional block diagram of a power supply or ballast generally designated by the reference number 10 for controlling the illumination of an electro-luminescent panel also referred to as an EL lamp in the specification. The power supply 10 is powered from a power source shown within the dashed line box 12 and which power source may be a commercial AC line supply typically 110 or 220 volts AC voltage supply. A high voltage AC voltage supply is generally more practical than a low voltage DC voltage supply for powering large EL lamp sizes contemplated by the present invention for example, electro-luminescent panels up to approximately 12,500 square inches in area. Operation from a low voltage DC voltage supply is useful for automotive and other mobile and remote applications where high voltage AC operation is impractical, and an embodiment of a ballast operating from a low voltage DC voltage supply is also described herein.

The output of the power source is coupled to the power supply 10 through supply lines 14, 16. A ground fault circuit interrupter circuit (GFIC) means 18 provides safety protection to a user and to the electronic circuitry components of the ballast in the event of a short or leakage current to ground or other similar malfunctions. The ground fault circuit interrupter 18 includes means 20 for testing the operation and response of the ground fault circuit interrupter 18. Means 22 are also provided to reset the ground fault circuit interrupter 18 in the event of a response to a condition which causes the ground fault circuit interrupter to disconnect power from the input to the remaining electronic circuitry of the power supply 10 which power is delivered to the circuitry of the power supply 10 via lines 24 and 26. The power on lines 24 and 26 is coupled to an in-rush current limiter circuit means 28 which functions to limit the current supplied to the power supply upon start-up and also to provide EMI (electromagnetic interference) filtering to substantially eliminate or reduce line-to-line noise and spurious emissions. The output of the in-rush current limiter circuit means 28 is coupled by supply lines 30 and 32 to an auto line voltage select circuit means 34 which senses and detects the magnitude of the power source voltage to condition the power supply for proper operation and to provide a universal accommodation for commercial AC power without operator intervention. The output of the auto line voltage select circuit means 34 on lines 36 and 38 are fed to a DC voltage supply circuit means 40 which produces the required DC voltage required for operation of the electronic circuit components of the ballast 10. The DC voltage potential output of the DC voltage supply circuit means 40 is coupled via supply lines 42, 44 to provide supply voltage to FET power driver circuit means 46, 48 respectively.

An oscillator control driver circuit means 50 produces a square wave at its output 52 that is coupled to a driver isolation coupler and logic circuit 54 that in turn provides a driving signal to control the switching of the FET power driver circuit means 46, 48. The output of the driver isolation coupler and logic circuit means 54 on leads 56, 58 are such that only one of the FET power driver circuit means 46, 48 can be conductive at a time. The output voltage of the FET power driver circuit means 46, 48 is coupled via output leads 60, 62 respectively to the EL lamp circuit means 64. A voltage limiter and load sense circuit means 66 is coupled to the EL lamp 64 which senses the voltage supplied to the EL lamp and supplies a feedback voltage signal at its output 68 in response to detection of a predetermined condition and which feedback voltage signal is fed to the oscillator control driver circuit means 50 to adjust the frequency output of the square wave on output 52.

The oscillator control driver circuit means 50 is also controlled by a soft start control circuit means 72 which provides a voltage signal at its output 74 which is fed to an input 76 of the oscillator control driver circuit means 50 to control the rate at which the EL lamp 64 increases or decreases in brightness. Special effects and other lighting control conditions are achieved via external input signals generated from the special effects and external input control digital to analog converter circuit means 78. The output of the special effects and external input control digital to analog converter circuit means 78 such as a movie theater lighting control panel or control board is coupled to the soft start control circuit means 72 via lead 80 and to the oscillator control driver circuit means 50 via lead 82.

A low voltage charge pump circuit means 84 is coupled to the low voltage DC voltage supply circuit means 40 via lead 86 and an AC line voltage supply lead via lead 88. The low voltage charge pump circuit means provides a steady and reliable low voltage DC voltage at its output 90 to supply the oscillator control driver circuit means 50 to ensure reliable operation and functioning of the oscillator control driver circuit means 50 in instances when the DC supply voltage varies outside the normal operating range of the electronic circuit components of the oscillator control driver circuit 50. An LED combination pilot and diagnostic indicator means 92 cooperates with the low voltage charge pump 84 to provide the regulated low voltage DC voltage supplied to the oscillator control driver circuit 50. The LED diagnostic indicator circuit means 92 provides a troubleshooting and diagnostic tool which is used to indicate the presence or absence of the input supply voltage, operation of the oscillator control driver circuit means, and in combination with the illumination state of the EL lamp an indication as to where trouble may originate in the ballast 10 if the LED is not illuminated.

Figures 2, 2A:
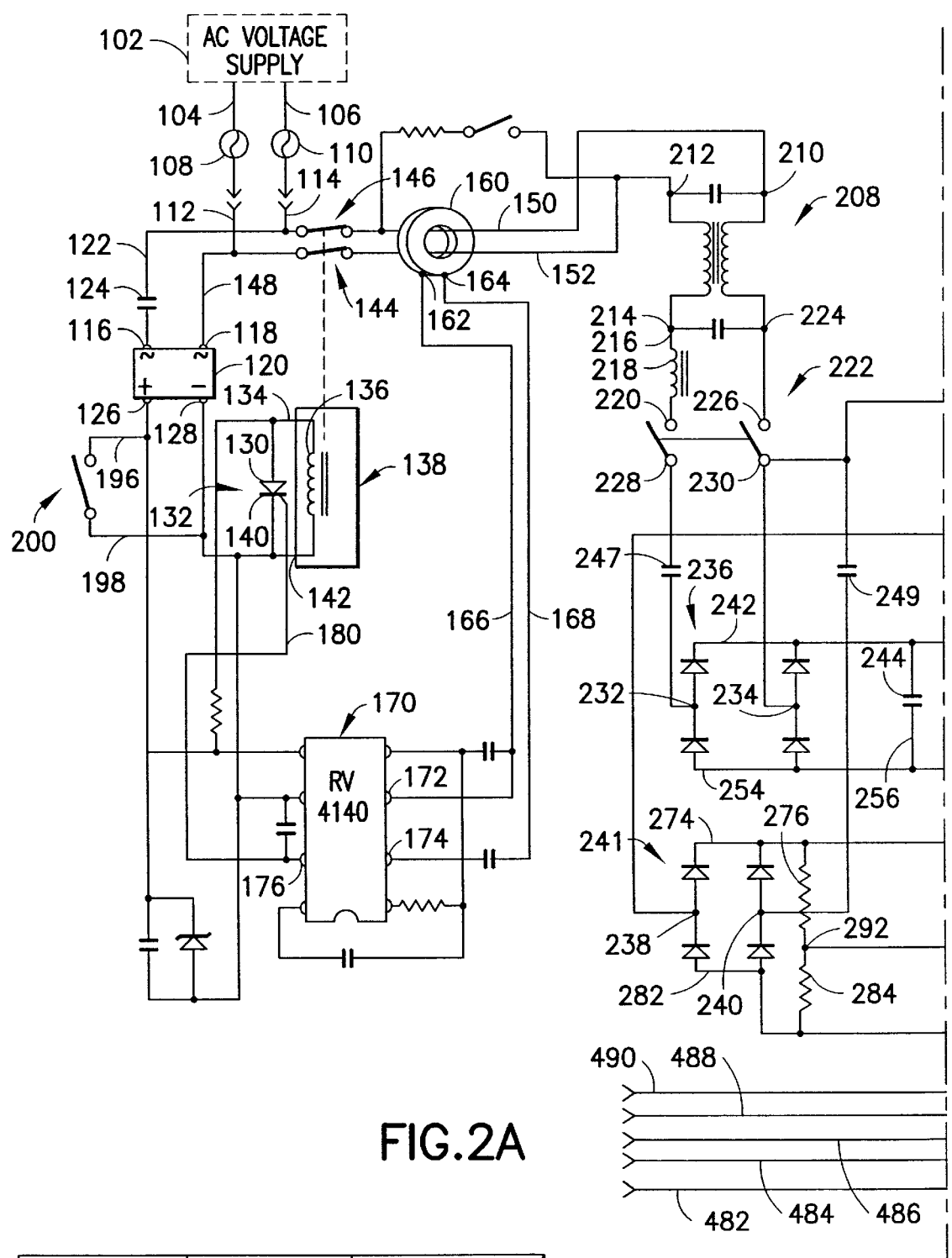
FIG. 2 is an electrical circuit schematic diagram of an AC operated power supply for an electro-luminescent lamp.
Figure 2B:
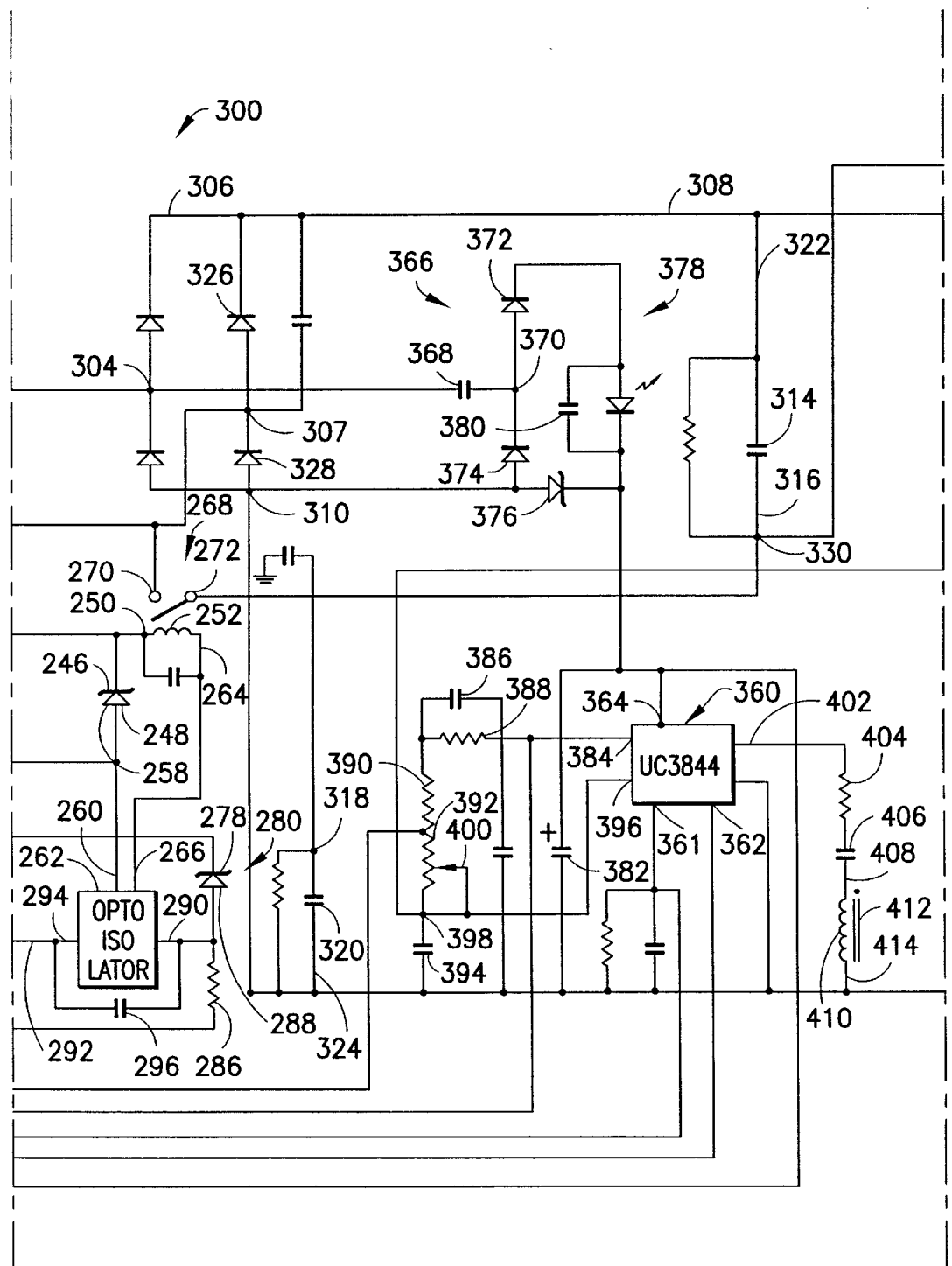
Figure 2C:
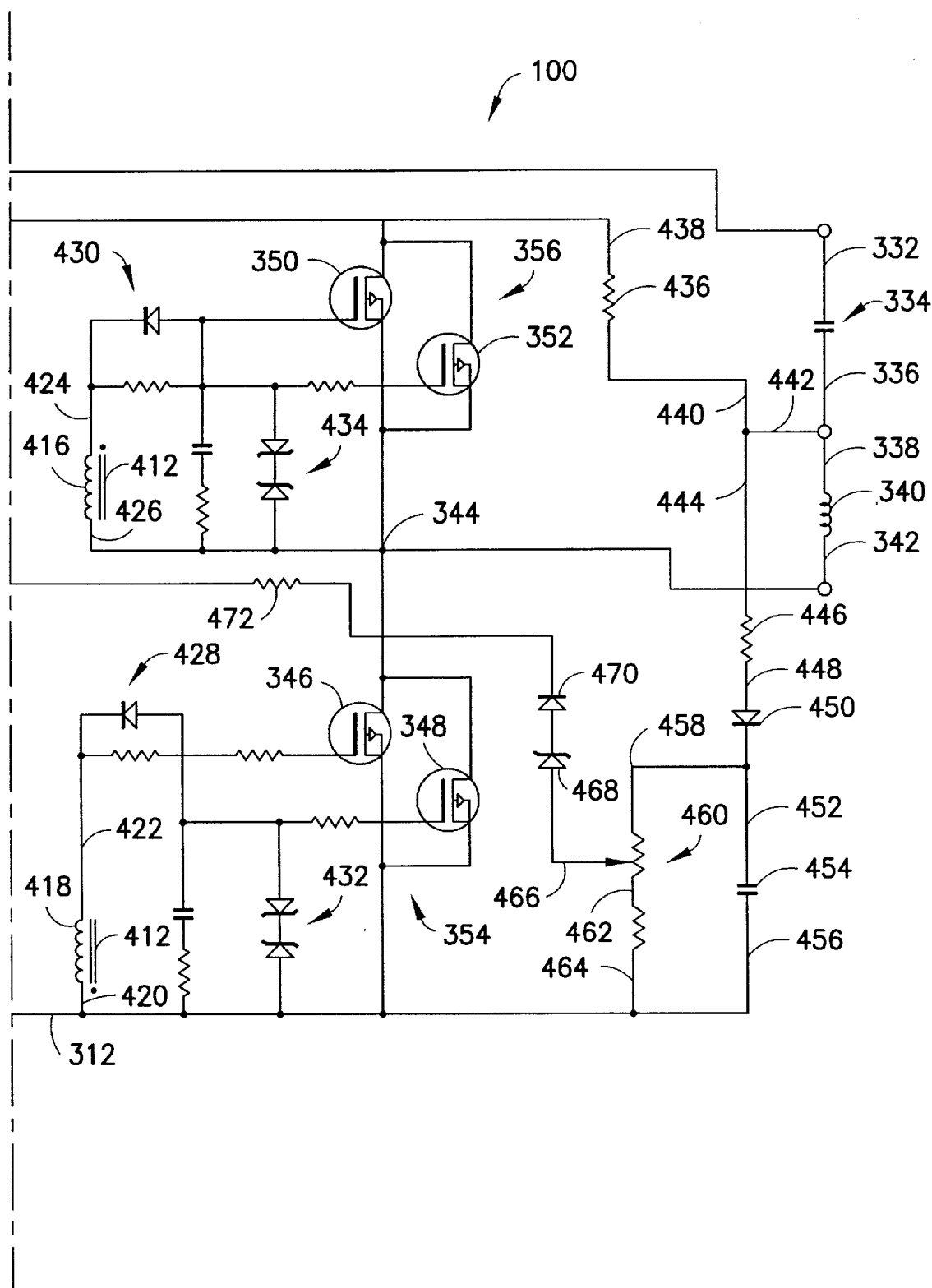

Turning now to FIG. 2, an electrical circuit schematic diagram of one embodiment of the power supply embodying the present invention is illustrated therein and generally designated by the reference number 100. Commercial AC power of 110 volts or 220 volts is provided from an AC voltage supply source shown generally within the dash line box 102. The AC voltage source is typically coupled to the ballast 100 through supply lines 104, 106 and line fuses 108, 110, respectively to the voltage input terminals 112, 114 of the ballast A ground fault current interrupter (GFCI) circuit embodied in the present invention functions by sensing, detecting and responding to a current output imbalance. The imbalance may be caused by an electrical short circuit, leakage current through a high impedance circuit path to ground or other voltage potential, electrical malfunction of the circuit being protected or other conditions known to those skilled in the art of GFCI protection to disconnect the AC voltage supply source from the remaining electronic circuitry of the ballast 100. The GFCI circuit of the present invention differs from commercially available ground fault interrupter (GFCI) circuit devices in at least one very important and critical manner described below. Commercial GFCI devices are mechanically latched to keep the normally open contacts of a relay closed to provide circuit continuity, and when tripped due to detection of a circuit imbalance, electromechanically release the closed contacts to the normally open condition to break the circuit continuity. The commercial GFCI can only be reset mechanically or manually by pushing a reset button or like means to physically move the relay into its operative condition to close the normally open contacts.

In contrast to a mechanical latching operation, the GFCI circuit of the present invention operates a relay to keep normally open contacts 144, 146 in a closed condition to provide electrical circuit continuity in the absence of a fault condition. The GFCI circuit operates as follows. The AC supply voltage applied to the input voltage terminals 112, 114 is coupled to the AC inputs 116, 118 respectively of a full wave bridge circuit means 120 with one side of the AC input voltage on line 122 being coupled to the full wave bridge AC input 116 through a series capacitor 124. The full wave bridge circuit 120 produces a dc voltage potential across its output terminals 126, 128 with the positive polarity voltage output 126 being coupled to the anode 130 of an SCR 132 and one side 134 of the coil 136 of the relay 138. The negative polarity voltage output 128 is coupled to the cathode 140 of the SCR 132 and the opposite end 142 of the coil 136 of the relay 138. The SCR 132 shunts the relay coil 136 to apply the full voltage output of the full wave bridge circuit 120 across the relay coil 136 when the SCR 132 is in its off or non-conductive state. The off state of the SCR 132 corresponds to the absence of a fault condition thereby allowing the relay 138 to operate to maintain the relay contacts 144, 146 respectively in a closed condition to electrically connect the AC voltage supply lines 122, 148 to the load side of the GFCI on lines 150, 152.

The lines 122, 148 carrying the AC supply voltage to the load side of the GFCI circuit pass through the closed contacts 144, 146, through AC supply leads 150, 152 connected to the contacts and through a current sensing coil 160. The sensing coil 160 has a winding of approximately 1:500 turns and the winding ends 162, 164 are connected to one end of the leads 166, 168 respectively. The leads 166, 168 of the sensing coil 160 are coupled to the inputs 172, 174 respectively of a low power controller integrated circuit means 170, such as for example, an RV4140 manufactured by Fairchild Semiconductor. The low power controller integrated circuit means 170 has an output 176 coupled to the gate drive lead 180 of the SCR 132. In normal operation, any output voltage produced across lines 166, 168 of the sensing coil 160 substantially balance and cancel each other because the current flowing in the lines 150, 152 is substantially equal in magnitude and opposite in phase on each half cycle. Since the input voltage signal to the low power controller integrated circuit means 170 are substantially equal, no voltage signal appears at the output 176.

An electrical short circuit or high impedance connection to one or both of the lines 150, 152 to ground potential, or other such conditions, will tend to cause an imbalance in the current in the lines 150, 152. A differential voltage is developed across the inputs 172, 174 of the low power controller integrated circuit means 170, which in turn generates a voltage signal at the output 176. The voltage signal on output 176 drives the gate 180 of the SCR 132 to cause the SCR 132 to become conductive and essentially place a short circuit across the relay coil 136. In the absence of current flow, the relay 138 will "drop" and open the contacts 144, 146 to remove the AC supply voltage from the load side output lines 150, 152 of the GFCI circuit. The SCR 132 is self-latching, that is, the SCR remains conductive without a further gate voltage being present provided the voltage potential at the anode 130 is positive relative to the voltage potential at the cathode 140.

Unlike commercial GFCI's discussed above that require mechanical action to reset, the GFCI circuit embodied in the present invention can be reset electronically and if desired, remotely from the GFCI circuit and ballast 100 itself. The GFCI circuit is reset by causing the SCR 132 to revert to its "off" state or non-conductive state. In one method, a momentary normally open push-to-operate switch 200 is placed across the DC voltage output 126, 128 of the full wave bridge 120. Operating the switch 200 effectively places a short circuit across the full wave bridge output 126, 128 and the SCR 132. The proper anode-to-cathode voltage relationship cannot be maintained thus causing the SCR 132 to become non-conductive. The leads 196, 198 of the switch 200 may be extended over a considerable distance from the actual location of the ballast 100 to permit resetting from a remote location such as for example, a control booth or projection booth.

The switch 200 could also be the switch portion of an opto-isolator device. The input to the opto-isolator can be controlled by a communications receiving device, such as an automatic answering machine that is responsive to a remote command to generate a signal to activate the opto-isolator to cause a closure or electrical short across the output 126, 128 of the full wave bridge 120. Other methods can be used, such as for example, a momentary normally closed push-to-operate switch is wired in series with the capacitor 124 in the supply line 122 so that operation of the switch removes one side of the AC input voltage to the full wave bridge 120. Removal of the AC input voltage to the full wave bridge 120 or the ballast 100 prevents the generation of an output DC voltage effectively removing the supply voltage to the SCR 132 causing the SCR 132 to become non-conductive. In all instances, when the SCR 132 is returned to its non-conductive state, current again flows through the relay coil 136 to operate the relay 138 to close the normally open contacts 144, 146.

The load side AC supply voltage across lines 150, 152 is coupled to the input of an in-rush current limiter device made up of a filter generally designated 208 and an inductor generally designated 218 is connected from the contacts 220, 226 through the transfer terminals 228, 230 of a double-pole single-throw (DPST) switch generally designated 222. The EMI filter provides EMI suppression on line-to-line noise. The input terminals 210, 212 on the filter 208 are connected to the AC voltage supply 150, 152, respectively. One of the output terminals 214 of the EMI filter 208 is connected to one side 216 of inductor 218 that is in series with a normally open contact 220 of DPST switch 222. The other of the filter output terminals 224 is connected to the other normally open contact 226 of the DPST switch 222. The DPST switch 222 is user controlled to turn-on and turn-off the ballast 100. The switch 222 functions as the power switch to connect and disconnect AC power to the ballast 100 and may be located elsewhere in the AC voltage supply input line, such as, for example, in electrical series with lines 112, 114 or a DPST switch could be used in the "hot" lead of the AC voltage supply to turn on and turn off the ballast 100.

The power supply 100 includes an auto line select logic circuit means that determines whether the AC supply voltage magnitude is 110 volts AC or 220 volts AC. The auto line voltage select circuit automatically detects and selects the correct voltage setting for the ballast 100 operation without human intervention allowing the ballast to be used throughout the world without worry if the proper voltage selection has been made. When the DPST switch 222 is operated to its ON position, the AC supply voltage is fed to the AC inputs 232, 234 of a first full wave bridge generally designated 236 and to the AC inputs 238, 240 of a second full wave bridge generally designated 241. Capacitors 247 and 249 are charge pump capacitors and function to reduce the high voltage supply to a low voltage supply for the full wave bridges 236, 241, respectively.

Full wave bridge 236 has its positive voltage potential output 242 connected to the junction of a filter capacitor 244, the cathode 246 of zener diode 248 and one side 250 of a relay coil 252. The negative voltage potential output 254 of the full wave bridge 236 is connected to the junction of the opposite side 256 of the filter capacitor 244, the anode 258 of the zener diode 248 and one output terminal 260 of an opto-isolator circuit means 262. The other end 264 of the relay coil 252 is connected to the other output terminal 266 of the opto-isolator 262. The internal transistor drive circuit of the opto-isolator 262 becomes conductive in response to an internal drive signal produced when a 110 volt AC supply voltage is sensed, and completes the electrical circuit to operate the relay 252 to close the transfer contact 268 of the relay 252 to connect relay terminal 270 to the relay transfer terminal 272.

The full wave bridge 242 has its positive voltage potential output 274 connected to the junction of one side of the resistor 276 and the cathode 278 of zener diode 280. The negative voltage potential output 282 of the full wave bridge 242 is connected to the junction formed by one side of the resistor 284 and a resistor 286 in series with the zener diode 280. The junction of the anode 288 of the zener diode 280 and the resistor 286 is coupled to one input 290 of the opto-isolator 262. Resistors 276 and 284 form a voltage divider network and the junction 292 of the two resistors is coupled to an input 294 of the opto-isolator 262. A capacitor 296 is connected across the terminals 290, 294 of the opto-isolator 262, and internal to the opto-isolator is a photodiode that is connected internally to terminals 290 and 294, respectively.

The internal photodiode of the opto-isolator 262 is connected as the load leg of a hybrid bridge circuit with resistors 276, 284, 286 and zener diode 280 forming the legs of the bridge. When the DPST switch 222 is operated to its ON position, AC supply line voltage is applied to the full wave bridges 236, 242. The ballast 100 initially turns on in the 220 volt AC operating mode to prevent any potential damage to the circuit components. In the 220 volt AC operating mode, the relay 252 is not operated, that is, no current flows through the relay coil 252 and the relay transfer contact 268 is open. The internal photodiode of the opto-isolator 262 initially is back biased, (non-conductive). The photodiode remains biased off until capacitor 296 can charge to a voltage potential to forward bias the internal photodiode. If 220 volts AC is applied, the zener diode 280 becomes conductive causing the voltage potential at terminal 290 to be biased positively relative to the voltage potential at terminal 294 thus maintaining the photodiode back biased. If 110 volts AC is applied, the zener diode 280 does not become conductive allowing current to flow through resistor 276, through the capacitor 296 and the resistor 286. The capacitor 296 will charge to a voltage potential that will forward bias the photodiode of the opto-isolator 262 to cause the photo diode to conduct and cause an internal transistor drive circuit to become conductive between terminals 260 and 266 to complete the relay circuit and close the relay contact switch 268. The delay in switching from 220 to 110 volt AC operation allows the circuit components and the EL lamp to "ramp-up" without full voltage applied to the load. The logic of the auto line select circuit and charging of the capacitor 296 operates in the range of 100 milliseconds and is thus unnoticeable to the human observer.

The 110 volt or 220 volt AC line voltage supply is also coupled to the AC inputs 302, 304 of a full wave bridge rectifier circuit means generally designated 300, through the transfer contacts 228, 230, respectively of the DPST switch 222 to generate the necessary DC voltage to drive the EL lamp. A positive DC rectified voltage potential output appears at the positive voltage potential output 306 of the full wave bridge 300 and is coupled along a DC voltage supply line 308. The negative voltage potential output 310 of the full wave bridge 300 is connected to negative voltage reference potential 312. A rectified DC voltage potential of approximately 311 volts is developed by the full wave bridge rectifier 300 with a 220-volt AC supply voltage applied. A rectified DC voltage potential of approximately 338 volts DC is developed by the full wave bridge rectifier 300 with a 110-volt AC supply voltage applied. Recalling that the auto line select circuit operates relay 252 to close the relay transfer contact 268 to reconfigure the ballast for operation at 110 volts AC, the full wave bridge rectifier circuit means is transformed into a voltage doubler circuit. One end 316 of capacitor 314 is connected to relay transfer contact 272 and to one side 318 of capacitor 320. The other side 322 of capacitor 314 is connected to the DC voltage supply line 308 and the other side 324 of capacitor 320 is connected to negative voltage reference potential 312. Capacitor 314 charges to the peak voltage on one half cycle of the input AC supply voltage and capacitor 320 charges to the peak voltage on the other half cycle of the input AC supply voltage. With 120 volts AC applied to the AC inputs 302, 304 of the full wave bridge rectifier 300, the DC voltage potential measured from the DC supply line 308 to negative voltage reference potential 312 is the sum of the peak voltages across each of the capacitors 314 and 320 or 338 volts DC nominally.

One end 332 of the electro-luminescent lamp generally designated 334 is also tied to the junction 330 of the capacitors 314 and 320 which insures that only AC power is supplied to the EL lamp 334 as the capacitors decouple any DC component that may possibly occur due to uneven duty cycles of power FETs described below. The opposite end 336 of the EL lamp 334 is connected to one end 338 of a choke 340. The other end 342 of the choke 340 is connected to the junction 344 formed by the totem pole arrangement of switching power FETs 346 and 348 which are connected in parallel with one another with the respective source terminals connected to each other and to the negative voltage reference potential 312. The drain terminals are connected to one another and to the junction 344. FETs 350 and 352 are likewise connected in parallel with the source terminals being connected to one another and to the junction 344 and the drain terminals being connected to one another and to the DC voltage supply line 308. The FET pair generally designated 354 and comprising FETs 346 and 348 and the FET pair generally designated 356 and comprising FETs 350 and 352 are alternately switched on and off in accordance with the drive signal provided by the driver isolation coupler and logic circuit means as explained below. The choke 340 and EL lamp 334 is designed as a series tuned circuit to provide a voltage boost and current averaging to the appropriate capacitive load of the EL lamp and are driven at the resonance frequency of approximately 650 Hertz for minimum power consumption and maximum brightness of the EL lamp. The inductance of the choke 340 interacts with the capacitance of the EL lamp 334 as it changes over its operating life to maintain a relatively constant current to the EL lamp 334. Since the capacitance of the EL lamp 334 becomes smaller due to aging, a compensating higher voltage helps the lamp stay relatively bright over its operating life.

The driver isolation coupler and logic circuit means includes a PWM controller generally designated 360 and is available for example as a current mode PWM controller such as a UC 3844 current mode PWM controller manufactured and available from Unitrode Integrated Circuits. The ground reference potential input 362 of the controller 360 is connected to the negative voltage reference potential 312. Power is supplied to the controller 360 through its VCC input 364. A charge pump circuit means generally designated 366 supplies a steady, constant DC voltage to the VCC voltage input 364 of the controller 360 independent of the current and voltage supplied to the EL lamp 334. The charge pump circuit means 366 comprises capacitor 368 having one end connected to the AC input 304 of the full wave bridge rectifier 300 and its opposite end connected to the junction 370 formed by the anode of diode 372 and the cathode of diode 374. The anode of the diode 374 is connected to the anode of a zener diode 376, which is nominally a 20-volt zener diode and to the negative voltage reference potential 312. The cathode of the diode 372 is tied to the anode of a light emitting diode (LED) generally designated 378 and one end of a capacitor 380. The cathode of the LED 378 is connected to the opposite end of the capacitor 380 and to the cathode of the zener diode 376 and to the VCC input 364 of the controller 360. The capacitor 382 charges to a voltage sufficient to breakdown the zener diode 376 so that a steady and nominal 20 volts is provided at the VCC lead input 364. Current flows through the diode 372 and LED 378, which lights indicating that the dc supply voltage is being supplied to the controller 360. On the positive half cycle of the AC input, the capacitor 368 charges to maintain the current flow through the diode 372 and LED 378 and zener diode 376 to maintain the 20 volt VCC supplied to the controller 360. Now switching to the negative half cycle, the capacitor 368 again discharges and repeats the cycle. The LED 378 acts as a diagnostic tool and when lit indicates that the dc voltage generating circuits are functional and operational. The capacitor 380 in parallel with the LED 378 substantially eliminates current spikes on the LED. A capacitor 382 is coupled between the VCC dc voltage input 364 and the negative voltage reference potential 312 and functions as a filter.

The controller 360 also includes an internal voltage regulator and provides a regulated 5 volts DC at its VREF output 384. The operating frequency of the ballast 100 is determined by an oscillator within the controller 360 and is regulated by a network comprising a soft start circuit means made up of the parallel combination of capacitor 386 and resistor 388, resistor 390, potentiometer 392 and capacitor 394. The soft start circuit comprising capacitor 386 and resistor 388 provides a delay of approximately 0.1 seconds which forces the frequency of the controller 360 to start high and then drop to the desired operating frequency to eliminate initial turn-on current spikes which could otherwise be supplied to the EL lamp 334 in the absence of the "soft-start."

The soft-start circuit means the network is wired in series between the VREF output 384 of the controller 360 and the negative voltage reference potential 312. The controller 360 has an input 396 connected to the junction 398 comprising one end of the capacitor 394, one end of the potentiometer 392 and one end of the wiper 400 of the potentiometer. The values of the resistors 388, 390 and potentiometer 392 and capacitor 394 are selected to provide the desired output frequency from the controller 360. The frequency of the voltage signal applied to the series connected EL lamp 334 and choke 340 is adjusted by the wiper 400 of the potentiometer 392 which trims the value of the resistive network to adjust the dc current level applied to capacitor 394 and to the input 396 and accordingly the frequency of the controller 360. Thus a user can change the initial brightness setting and obtain desired brightness of the EL lamp by adjustment of the potentiometer wiper 400.

The controller 360 generates a square wave at its output 402. The output 402 is connected to a series resistor 404, decoupling capacitor 406 and one side 408 of the primary winding 410 of step up transformer 412. The other end 414 of the primary winding 410 is connected to the negative voltage reference potential 312. The square wave drive voltage signal at the output 402 has a peak-to-peak value from negative voltage reference potential 312 to VCC voltage potential at its input 364. The decoupling capacitor 406 decouples the dc voltage component and causes the square wave voltage signal appearing across the primary winding 410 to appear as a bipolar alternating square wave having a peak positive voltage potential equal to one-half VCC voltage and a peak negative voltage potential equal to one-half VCC voltage reference potential. The transformer 412 has two secondary windings 416 and 418 that are logically poled with respect to the primary winding 410 for controlling the FET pairs 354 and 356, respectively. In the illustrated embodiment, the primary winding 410 is poled so the positive sense is at the end 408. The secondary winding 418 is poled so that its positive sense is at the end 420 connected to the negative voltage reference potential 312 and its opposite end 422 is coupled to the gate terminals of the FET pair 354. The secondary winding 416 has its positive sense end 424 coupled to the gate terminals of FET pair 356 and its opposite end 426 coupled to the junction 344 formed between the two FET pairs 354, 356 and one end 432 of the choke 340. The logic of the transformer windings ensures that only one of the FET pairs 354, 356 can be conductive at a time to switch the EL lamp 334 and series choke 340 between the negative voltage reference potential 312 and the DC voltage potential on supply lead 308.

Diode-resistor parallel networks 428 and 430 are connected in series between the respective ends 422, 424 of the secondary windings and the gate terminals of the FET pairs 354, 356 to ensure that the voltage signal supplied to the gate terminal makes the FET pair non-conductive faster on turn-off than on turn-on to prevent shoot-through as the FET pairs 354, 356 transition from on to off conductive states. A cathode-to-cathode zener diode network generally designated 432 and 434 is coupled to the gate terminals of the FET pair 354 and 356, respectively. The zener diode network functions to clamp the gate terminal signals to prevent over voltage and ringing on the gate terminals of the FETs. The transformer 412 is a step up transformer having a turns ratio of 1:2 to provide a gate drive voltage signal to the FET pairs 354, 356 that has a peak-to-peak voltage magnitude swing corresponding to twice the magnitude of the dc VCC voltage supplied to the controller 360.

The maximum voltage that can be applied to the EL lamp 334 by the ballast 100 is preset to a desired value by a voltage limit sensing and adjustment circuit means. A high impedance sensing circuit is formed by a high ohmic value resistor 436 having one end 438 connected to the DC supply line 308 and its other end 440 connected to the junction 442 formed between the end 336 of the EL lamp 334, the end 338 of the choke 340 and one end 444 of a high ohmic value resistor 446. The other end 448 of the resistor 444 is connected to the anode of a diode 450. The cathode of the diode 450 is connected to one side 452 of a capacitor 454 having its opposite side 456 connected to negative voltage reference potential 312. The junction formed at the cathode of the diode 450 and one end 452 of the capacitor 454 is connected to one end 458 of a potentiometer 460. The other end 462 of the potentiometer 460 is connected to negative voltage reference voltage potential 312 through a resistor 464.

A feedback circuit means to the controller 360 input 396 is formed by the series connection of the wiper 466 of the potentiometer 460, zener diode 468 having its cathode connected to the wiper 466 and its anode to the anode of diode 470. The cathode of diode 470 is connected to the input 396 of the controller 360 through the series resistor 472.

The maximum voltage that can be applied to the EL lamp 334 is preset at the factory by adjustment of the wiper 466 on the potentiometer 460, for example to a peak voltage limit of 330 volts. As the voltage across the EL lamp 334 increases, due for example to aging of the EL lamp, the voltage charge on capacitor 454 increases in magnitude until the voltage rating of the zener diode 468 is exceeded to allow current flow and application of the feedback voltage to the controller 360 input 396. The feedback voltage at the input 396 controller 360 will cause the frequency of the controller and accordingly the frequency of the voltage signal applied to the EL lamp to increase and effectively shift the resonance point along the rising slope of the driving voltage.

This shift along the rising slope changes the input dc voltage to the controller 360 to increase the magnitude of the drive voltage signal, which tends to limit the maximum voltage supplied to the EL lamp while allowing the voltage applied across the EL lamp 334 to increase to compensate for a change in capacitance value of the EL lamp. This compensation feature is also particularly beneficial if the EL lamp is used in cold environments or out of doors because capacitance decreases as the temperature decreases which normally causes the applied voltage to increase significantly adversely affecting the EL lamp operation and shortening the useful life of the EL lamp.

As the electro-luminescent panel ages, the voltage applied will increase in order to maintain the applied current constant, whereby the diminishment in brightness of the lamp is slowed down over its operating life. Once a predetermined limiting voltage level is reached, the present invention will maintain a fixed voltage in order to prevent a runaway voltage increase. Further, the frequency applied to the lamp is substantially maintained at a constant level in order to prevent shift in the color emanating from the lamp and to prevent accelerated aging of the lamp as is otherwise typical of prior tuned inverters with output compensation.

The power supply 100 of the present invention also provides special effects such as flashing of the EL lamp in response to external input control signals. The controller 360 is also selectively controllable from external circuitry through connections made at a combination of terminals that are accessible externally through a connector or other circuit connection means generally designated 480. A terminal 482 is connected to the VCC voltage supply input 364 of the controller 360. Terminal 484 is connected to the negative voltage reference potential 312. Terminal 486 is connected to the ISENSE input 361 of the controller 360. The ISENSE input turns off the controller 360 when a positive voltage pulse is applied to the ISENSE input 361. Terminal 488 is connected to the VREF voltage output 384 of the controller 360. Terminal 490 is connected to the input 396 of the controller 360 through the potentiometer 392.

Figure 3:
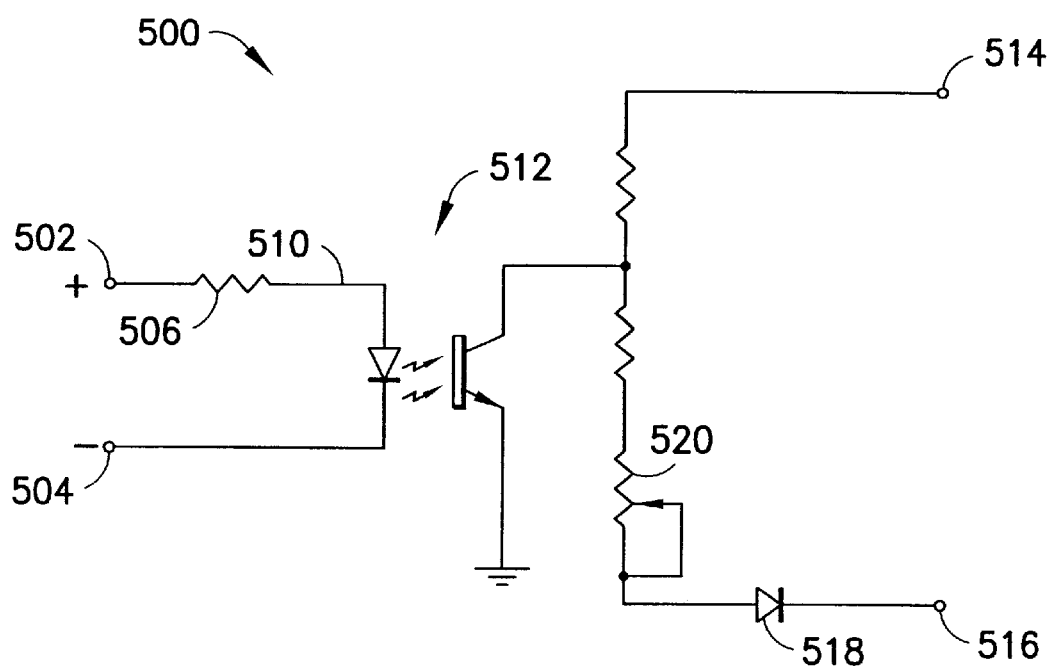
FIG. 3 is an electrical circuit diagram that may be used with the present invention for interfacing external voltage command signals to provide special effects control of the electro-luminescent lamp.

FIG. 3 illustrates one exemplary embodiment of an input control circuit means generally designated 500 to interface with external components, equipment and systems to provide external control signals, such as, for example, an analog dimming signal to the controller 360. As illustrated in FIG. 3, a DC voltage potential for example, 0 to 10 volts DC is applied across the input terminals 502 and 504, respectively. The terminal 502 is connected to a resistor 506 and the anode of a photodiode of the opto-isolator 512. The cathode of the photodiode is connected to the negative potential terminal 504. DC voltage is supplied to the circuit 500 by connecting lead 514 to the terminal 488, which is the VREF voltage of the controller 360. A variable DC current is fed through a diode 518 having its anode connected through a resistive network to the collector of the phototransistor and its cathode connected to the output 516, which is connected to the terminal 490 to control the charge current to the capacitor 394 and to the controller 360. As the DC voltage input across terminals 502 and 504 is varied, the phototransistor of the opto-isolator 512 conducts proportionally to vary the voltage applied to the output 516. A trimming potentiometer 520 is in series with the diode 518 to adjust the off or dim setting of the EL lamp when there is no input to the opto-isolator. Raising the voltage input feed to the phototransistor pulls down the voltage to the diode 518, which finally comes out of conduction and at the threshold, full brightness of the EL lamp is obtained. The DC input signal to the control input of the dimming circuit means can be varied and different voltage potential can be accommodated by changing the value of the resistor 506. Recalling that the brightness of the EL lamp 334 is dependent on the magnitude of the voltage applied across the lamp and that the applied voltage is proportional to the frequency of the driving signal produced by the controller 360, varying the input voltage to the controller 360 accordingly varies the frequency of the driving signal to the resonant circuit made up of the choke 340 and the capacitance of the EL lamp 334 and the brightness of the EL lamp. Thus the EL lamp 334 can be dimmed by causing the frequency of the controller 360 to increase, which drops the applied voltage across the EL lamp to approximately 60 volts from its full brightness applied voltage of approximately 280 volts. The EL lamp can be, for all practical purposes, substantially dimmable to black.

Other special effects such as flashing can be accomplished by providing a pulsed positive going signal to the terminal 486 to control the ISENSE input 361 of the controller 360. The output voltage signal on lead 402 of the controller 360 is latched in response to a positive voltage signal at its ISENSE input 361. It can be seen that the EL lamp can be made to turn-on and turn-off at a desired flashing rate by controlling the pulse rate to the ISENSE input. Other analog signals such as those derived from a digital-to-analog converter can be input to the terminal 490 to control the power supply 100. Such a digital-to-analog signal converter could be used for example in a decoding protocol for external digital signals generated by computer controls or other lighting controls utilized in theaters and like facilities. The input control circuit means 500 provides an additional degree of safety to a user by electrically isolating the external components, equipment and systems from the relatively high DC voltages present on the positive and negative DC voltage supply lines 308, 312, respectively. The foregoing is not meant to be inclusive of the various arrangements that can be used to provide external control signals to the power supply 100 but are intended to serve as examples only.

Figures 4, 4A:
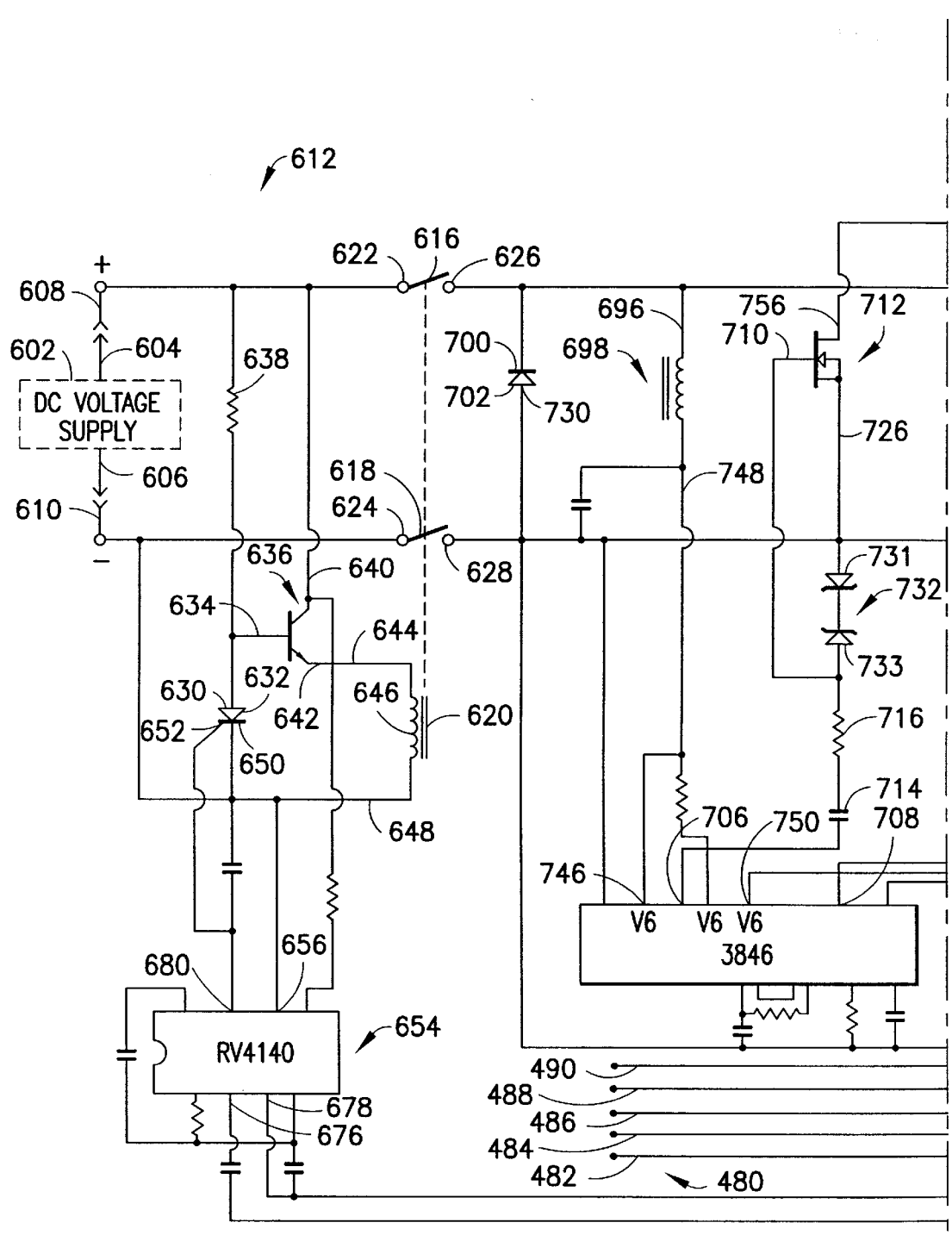
FIG. 4 is an electrical circuit schematic diagram of an alternate embodiment showing a DC operated power supply for an electro-luminescent lamp.
Figure 4B:
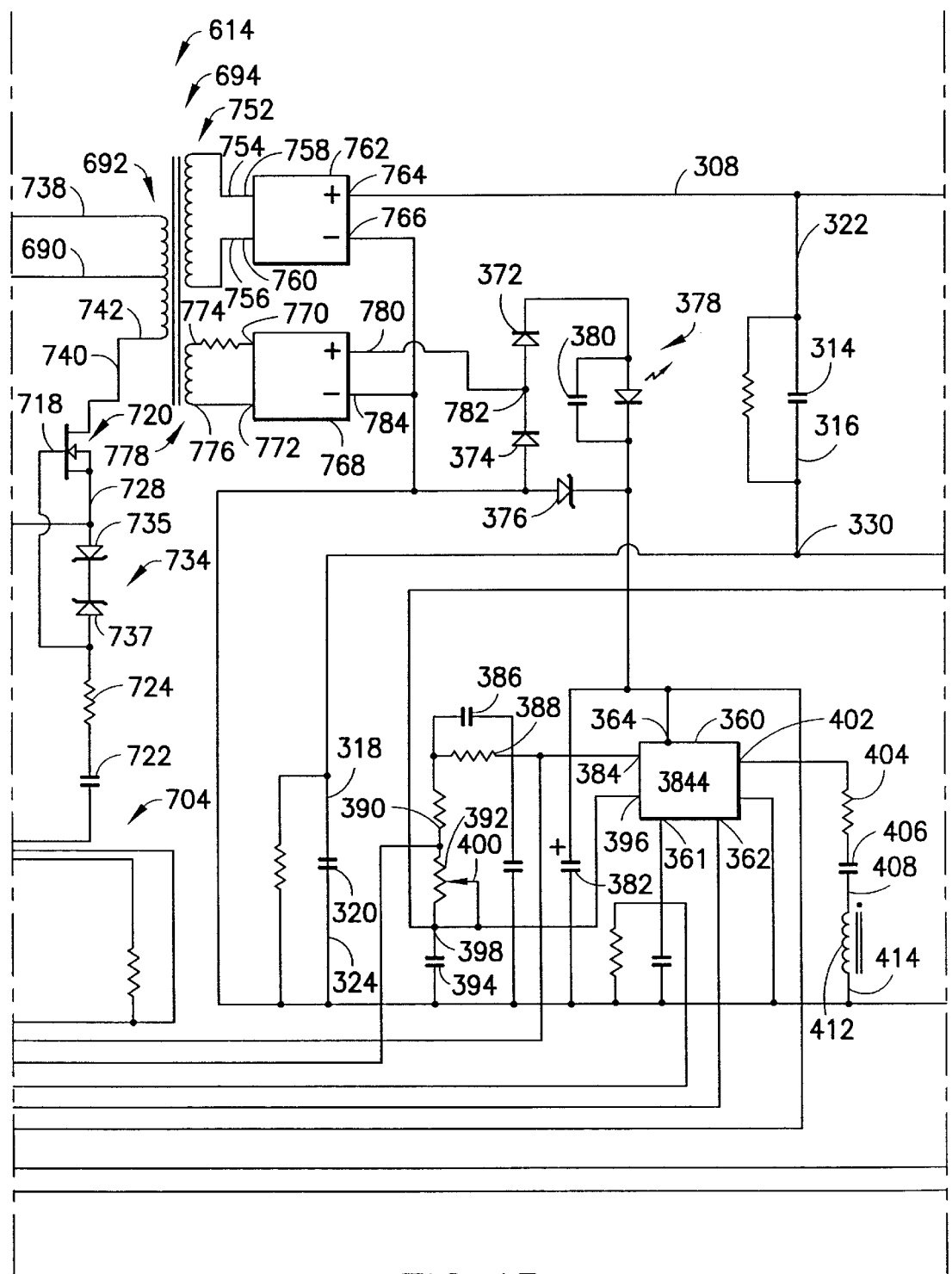
Figure 4C:
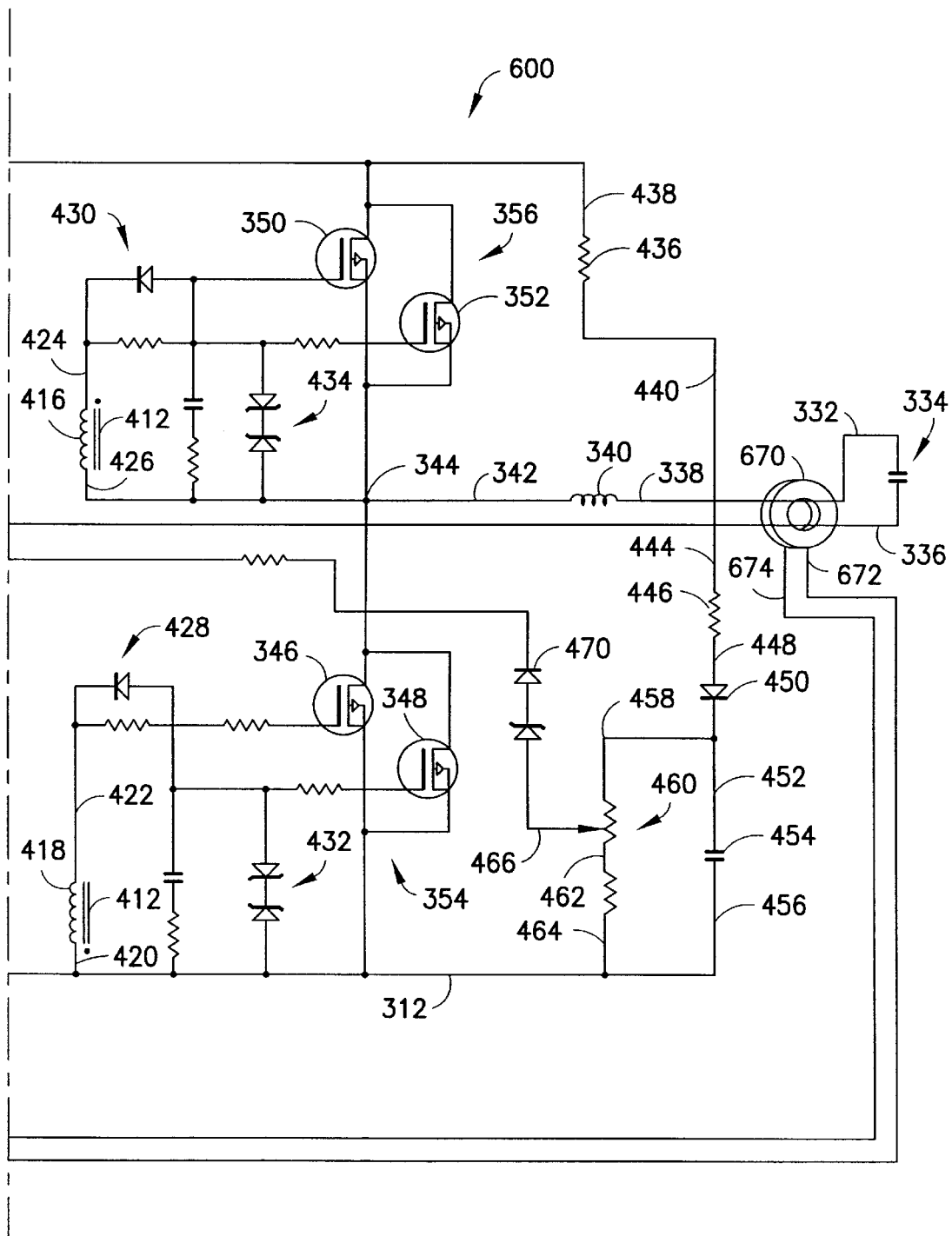

Turning now to FIG. 4, an electrical circuit schematic diagram of an alternate embodiment of the ballast embodying the present invention operating from a DC voltage supply is illustrated therein and generally designated by the reference number 600. The EL lamp driving and control circuit portion and operation of the DC voltage supplied ballast 600 is similar to the AC voltage supplied ballast 100 of FIG. 1 and like parts and components have the same reference numbers and function in both so therefore their operation will not be described in detail with respect to FIG. 4. The ballast 600 is powered from a DC voltage supply source shown generally within the dash line box 602. The DC voltage source is typically coupled to the ballast 600 through supply lines 604, 606 and if desired line fuses, respectively across the positive polarity voltage input terminal 608 and negative polarity voltage input terminal 610 of the ballast 600. The DC voltage source is preferably in the 24 to 28 volt range but other magnitude voltages can be used with proper component value selection to accommodate the specific DC voltage used. The DC voltage source may be for example, an automobile battery, or other such batteries or cells.

A DC voltage Ground Fault Current Interrupter Circuit (DC GFCI) means generally designated by the reference number 612 protects the ballast 600. The DC GFCI circuit 612 has similar features and advantages as the GFCI of the ballast 100 illustrated in FIG. 2. The DC GFCI circuit is coupled to a DC-to-DC voltage step up circuit generally designated by the reference number 614. The DC-to-DC voltage step up circuit 614 converts the lower magnitude 24 volts DC to the approximately 318 volts dc required to power the EL lamp. The DC power source is coupled to the DC-to-DC voltage step up circuit 614 through the normally open contacts 616, 618 of the relay 620 of the DC GFCI circuit. The transfer contact 622 of relay contact 616 is coupled to the dc voltage positive polarity terminal 608 and the transfer contact 624 of relay contact 618 is coupled to the dc voltage negative polarity terminal 610. The anode 630 of an SCR 632 is connected to the base 634 of a transistor 636 configured as an emitter follower and to the dc positive polarity voltage terminal 608 through a resistor 638. The emitter 642 of transistor 636 is connected to one side 644 of the relay coil 646 of relay 620. The opposite side 648 of the relay coil 646 is connected to the cathode 650 of the SCR 632, the dc negative voltage terminal 610 and the neutral terminal input 656 of the a low power controller integrated circuit means 654, such as for example, an RV 4140 manufactured by Fairchild Semiconductor. The SCR 632 shunts the base-emitter junction of the transistor 636 and the relay coil 646 to apply the full dc supply voltage across the relay coil 646 when the SCR 632 is in its off or non-conductive state. The off state of the SCR 632 corresponds to the absence of a fault condition thereby allowing the relay 620 to operate to maintain the relay contacts 616, 618 respectively in a closed condition to electrically connect the DC voltage supply across terminals 608, 610 to the load side of the DC GFCI 612 on terminals 626, 628 respectively.

The lines 332, 336 carrying the alternating drive voltage power to the EL lamp 334 pass through a current sensing coil 670. The sensing coil 670 has a winding of approximately 1:500 turns and winding end leads 672, 674, respectively. The leads 672, 674 of the sensing coil 670 are coupled to the inputs 676, 678 respectively of the low power controller 654. The low power controller 654 has an output 680 coupled to the gate drive lead 652 of the SCR 632. In normal operation, no output voltage is produced across leads 672, 674 of the current sensing coil 670 because the current flowing in the lines 332, 336 is substantially equal in magnitude and opposite in phase on each half cycle. Since the input voltage signal to the low power controller 654 is substantially equal and balanced, no voltage signal appears at the output 680.

An electrical short circuit or high impedance connection to one or both of the leads 332, 336 to ground potential, or other such conditions, or other circuit malfunctions that would tend to cause an imbalance in the currents in the leads 332, 336 causes a differential voltage to be developed across the inputs 676, 678 of the low power controller 654 which in turn generates a voltage signal or pulse at the output 680. The voltage signal on the output 680 drives the gate 652 of the SCR 632 to cause the SCR 632 to become conductive and essentially place a short circuit across the base-emitter junction and relay coil 646, which causes the transistor 636 to become non-conductive. In the absence of current flow, the relay 620 will "drop" and open the contacts 616, 618 to remove the dc supply voltage from the load side output terminals 626, 628 of the DC GFCI circuit. The SCR 632 is self-latching and remains conductive without a further gate voltage being present provided the voltage potential at the anode 630 is positive relative to the voltage potential at the cathode 650. As in the case with the AC GFCI circuit, the DC GFCI circuit is resettable remotely by either removing power from the SCR or placing a momentary short circuit across the SCR to cause it to become non-conductive.

The load side of the DC supply voltage across terminal 626, 628 is coupled to the input of a DC-to-DC voltage step-up converter to generate the desired DC supply voltage on line 308. The DC-to-DC step-up voltage circuit operates as follows. The DC supply voltage is applied across terminal 626, 628 by the transfer contact 616, 618 respectively with the positive polarity DC voltage applied to terminal 626. The terminal 626 is coupled to the center tap 690 of the primary winding 692 of the transformer 694 and to one end 696 of an inductor or choke 698 and the cathode 700 of a diode 702. A low power controller fixed frequency current mode integrated circuit means generally designated 704 provides a voltage pulse at its outputs 706, 708, respectively. The output 706 is coupled to the gate 710 of a FET 712 through a series capacitor 714 and resistor 716. Likewise, the output 708 of the low power controller 704 is coupled to the gate terminal 718 of a FET 720 through a series capacitor 722 and resistor 724. The source terminal 726 of FET 712 and source terminal 728 of FET 720 are connected to the negative DC supply voltage terminal 628 and the anode 730 of the diode 702. Cathode-to-cathode zener diode networks 732, 734 are connected in parallel with the gate-source junctions of the FETs 712, 720, respectively to provide protection against voltage spikes during turn-on and turn-off and to regulate the maximum voltage that can be applied to the gate terminals 710, 718 of the FET's 712, 720, respectively. The drain terminal 736 of the FET 712 is connected to one end 738 of the primary winding 692 and the drain terminal 740 of the FET 720 is connected to the other end 742 of the primary winding 692. The low power controller 704 provides a voltage pulse at its respective output 706, 708 to alternately cause the FET 712, FET 720 to turn-on and turn-off to induce an alternating voltage across the primary winding 692. The DC voltage input 746 to the low power controller 704 is connected to one end 748 of the inductor 698 to receive the necessary positive polarity DC voltage. The ground potential terminal 750 of the low voltage controller 704 is connected to the negative polarity DC voltage terminal 628. The low power controller 704 is a current mode PWM controller and is available, for example, from Texas Instrument as a model UC3846. The operation of such a low power controller is generally understood by those skilled in the art of fixed frequency, current mode control system design and for which additional information can be obtained from the manufacturer's data sheets. The capacitors 714, 722 decouple the DC voltage from the output voltage signals produced by the controller 704 and which output voltages follow the VCC voltage to produce a pulse that swings from zero to VCC, which could be 25–28 volts. The capacitor 722 decouples the DC voltage so the voltage to the FET gate 718 can swing positive and negative as controlled by the zener diode network 734. Zener diode 735 is a 15-volt zener diode and zener diode 737 is a 5-volt zener diode. The voltage to the gate terminal 718 is limited to 15 volts and capacitor 722 charges to 5 volts when the output voltage signal from the controller 704 goes positive. When the controller output voltage signal returns to ground potential, capacitor 722 has a 5 volt charge which applies a negative voltage signal to the gate terminal 718 to insure that FET 720 turns off. Capacitor 714, zener diodes 731, 733 and FET 712 operate in a substantially identical manner.

The alternating voltage induced in the primary winding 692 is coupled to the secondary winding 752 of the transformer 694 with the appropriate step-up turns ratio to provide approximately 625 volts peak-to-peak across the secondary winding terminals 754, 756. The output terminals 754, 756 of the secondary winding 752 are coupled to the inputs 758, 760, respectively of a full wave rectifier bridge circuit means 762. The positive polarity DC output terminal 764 of the full wave bridge rectifier 762 is connected to the DC supply voltage line 308 of the ballast 600 and provides a DC voltage potential of approximately 312 volts. The negative polarity output terminal 766 of the full wave bridge 762 is connected to the negative voltage reference potential line 312 of the ballast 600. The DC voltage power for the circuit components such as the controller 360 is generated from a full wave bridge 768 having its AC input terminals 770, 772 connected to the ends 774, 776 respectively of a second secondary winding 778 of the transformer 694. The turns ratio of the winding 778 is set so that the full wave bridge 768 produces an approximate 20 volts DC potential at the DC positive polarity output terminal 780. The terminal 780 is connected to the junction 782 formed by the anode of diode 372 and the cathode of diode 374 to provide a regulated DC voltage input to the voltage input terminal 364 of the low power controller 360. The DC negative polarity terminal 784 of the full wave bridge 768 is connected to the negative voltage reference potential line 312. The remaining circuitry of the ballast 600 operates in a substantially identical manner as described in connection with the ballast of FIG. 2. Thus, it will be noted that the power supply embodying the present invention is well suited and adapted to operate with both an AC and DC input voltage power source.

Although this invention has been shown and described with respect to exemplary embodiments thereof, it should be understood by those skilled in the art that the foregoing and various other changes, omissions, and additions in the form and detail thereof may be made therein without departing from the spirit and scope of the invention. Accordingly, the invention has been described by way of illustration rather than limitation.

What is claimed is:

1. A power supply for illuminating an EL lamp with a constant current and frequency drive signal having a predetermined limiting voltage level for compensating changes in the EL lamp characteristics, said power supply comprising:

means for providing an input voltage power source signal to said power supply, said power supply having EL lamp voltage drive circuit means for generating an EL lamp alternating voltage drive signal having a substantially constant current and frequency;

electronic ground fault current interrupter circuit means coupled to said input voltage power supply signal for transferring said input voltage power source signal to said EL lamp voltage drive circuit means, said EL lamp drive circuit means having means for generating a first and second DC high voltage supply signals;

PWM low power controller circuit means for generating an alternating voltage pulse signal having a selectable predetermined frequency;

transformer logic circuit means coupled to said PWM controller circuit means for receiving said alternating voltage pulse signal and having a first and second transformer logic circuit output means for producing a first and second output alternating voltage signal, said first and second output alternating voltage signal having a 180 degree phase relationship with respect to each other;

first electronic switching means having a conductive and non-conductive state coupled to said first transformer logic circuit output means and responsive to said first output alternating voltage signal;

second electronic switching means having a conductive and non-conductive state coupled to said second transformer logic circuit output means and responsive to said second output alternating voltage signal;

said first electronic switching means and said second electronic switching means connected in series with one another and a resonant circuit means including said EL lamp, one of said first and second electronic switching means further being connected to said first DC high voltage supply signal, the other of said first and second electronic switching means further being connected to said second DC high voltage supply signal, said first and second electronic switching means alternately connecting and disconnecting said first and second DC supply voltage signals respectively to said EL lamp to power said EL lamp with a peak-to-peak AC voltage drive signal at said selectable predetermined frequency and constant current.

2. The power supply as defined in claim 1 wherein said input voltage power source signal is a commercial 110 volt AC or 220 volt AC voltage and said EL lamp voltage drive circuit means for generating said first and second DC high voltage supply signals further includes automatic line voltage select circuit means for sensing and detecting the voltage power source signal to condition the power supply for one of the 110 volts or 220 volts operating modes corresponding to the presence of a 110 volts or 220 volts input voltage power source signal without operator intervention.

3. The power supply as defined in claim 2 wherein said electronic ground fault current interrupter circuit means further comprises: relay circuit means for coupling said AC input voltage power source signal to said DC high voltage supply potential operating means, current sensing means for detecting and responding to an imbalance in AC current supplied to said DC high voltage supply potential generating means, self-latching SCR circuit means coupled to and shunting said relay means for diverting electrical current away from said relay means in response to the detection of said current imbalance to cause said relay circuit means to become inoperative and disconnect said AC input voltage power source signal from said DC high voltage supply potential operating means.

4. The power supply as defined in claim 3 further including electronic reset circuit means to restore said electronic ground fault current interrupter circuit means to re-connect said AC input voltage power source signal to said DC high voltage supply potential generating means without operator intervention.

5. The power supply as defined in claim 4 wherein said electronic reset circuit means operates remotely and apart from the power supply location.

6. The power supply as defined in claim 4 wherein said electronic reset circuit means operate in response to a communication receiving means.

7. The power supply as defined in claim 1 further including diagnostic indicator circuit means for identifying and localizing one or more likely sources of component failure when said EL lamp does not illuminate, said diagnostic indicator circuit means further includes a dc low voltage supply circuit means for powering said PWM low power controller circuit means and a light emitting diode (LED), said LED emitting light when said dc low voltage supply circuit means is operational and being extinguished when said dc low voltage supply circuit means is non-operational.

8. The power supply as defined in claim 1 further including input control circuit means coupled to said PWM low power controller circuit means for receiving and interfacing external control signals to produce special lighting effects including flashing and dimming said EL lamp.

9. The power supply as defined in claim 1 wherein said input voltage power source signal is a dc voltage potential and including DC voltage to AC voltage converter circuit means for generating an AC high voltage potential, said AC high voltage potential further being coupled to AC voltage to DC voltage converter circuit means for generating said first and second DC high voltage supply signals.

10. A power supply for illuminating an EL lamp, comprising:

means for providing an input voltage power source signal to said power supply, said power supply further comprising circuit means coupled to said EL lamp for generating an alternating drive voltage signal having a substantially constant current and frequency to illuminate said EL lamp;

electronic ground fault current interrupter circuit means coupled to said input voltage power source signal for transferring said input voltage power source signal to said circuit means, said circuit means further comprising DC high voltage generating circuit means for producing a first and second DC voltage supply signals;

said alternating drive voltage signal generating means comprising an alternating voltage signal controller circuit means for producing an alternating voltage signal having a predetermined frequency;

transformer logic circuit means coupled to said alternating voltage signal controller for receiving said alternating voltage signal, said transformer logic circuit means further including a first and second output means for producing a first and second logic output alternating voltage signal, said first and second alternating voltage signal having a 180° phase relationship with respect to each other;

first electronic switching means having an input coupled to said first logic output means;

second electronic switching means having an input coupled to said second logic output means;

said first and second electronic switching means each having a conductive and non-conductive operating state and being connected in series with one another and to a resonant circuit means comprising a choke and the EL lamp;

one of said first and second electronic switching means being connected to said first DC high voltage supply signal and the other of said first and second electronic switching means being connected to said second DC high voltage supply signal;

said one of said first and second electronic switching means switching to its conductive state in response to said first logic output voltage signal to connect said first DC high voltage supply signal to said EL lamp, and the other of said one of said first and second electronic switching means switching to its non-conductive state in response to said second logic output voltage signal to disconnect said second DC high voltage supply signal to said EL lamp during one half cycle of said first and second logic output voltage signal; and said other of said one of said first and second electronic switching means switching to its conductive state in response to said second logic output voltage signal to connect said second DC high voltage supply signal to said EL lamp, and the said one of said first and second electronic switching means switching to its non-conductive state in response to said first logic output voltage signal to disconnect said first DC high voltage supply signal to said EL lamp during the other half cycle of said first and second logic output voltage signals.

* * * * *